(12) United States Patent
Liu

(10) Patent No.: US 8,106,328 B2
(45) Date of Patent: Jan. 31, 2012

(54) QUICK TEMPERATURE COMPENSATION METHOD FOR AN ELECTRIC SOLDERING IRON AND A QUICK TEMPERATURE COMPENSABLE ELECTRIC SOLDERING IRON

(75) Inventor: Xiaogang Liu, Guangdong (CN)

(73) Assignee: L Lab Corporation, Shenzhen (CN)

( * ) Notice: Subject to any disclaimer, the term of this patent is extended or adjusted under 35 U.S.C. 154(b) by 1004 days.

(21) Appl. No.: 11/993,222

(22) PCT Filed: Jun. 19, 2006

(86) PCT No.: PCT/CN2006/001385
§ 371 (c)(1),
(2), (4) Date: Dec. 20, 2007

(87) PCT Pub. No.: WO2006/136094
PCT Pub. Date: Dec. 28, 2006

(65) Prior Publication Data
US 2010/0224598 A1    Sep. 9, 2010

(30) Foreign Application Priority Data
Jun. 24, 2005  (CN) .......................... 2005 1 0035582

(51) Int. Cl.
*B23K 3/03* (2006.01)
(52) U.S. Cl. .................. 219/85.16; 219/221; 219/227; 219/240; 228/51
(58) Field of Classification Search ............... 219/85.16, 219/221, 227, 229, 233, 240, 241, 494; 228/51, 228/55; 700/299
See application file for complete search history.

(56) References Cited

U.S. PATENT DOCUMENTS

| 4,861,967 | A | * | 8/1989 | Yoshimura | 219/241 |
| 4,924,067 | A | * | 5/1990 | Wilhelmson | 219/241 |
| 4,960,975 | A | * | 10/1990 | Weinbrecht | 219/241 |
| 5,021,634 | A | * | 6/1991 | Santoro et al. | 219/241 |
| 5,495,093 | A | * | 2/1996 | Griffith | 219/497 |
| 6,093,915 | A | * | 7/2000 | Postlewait et al. | 219/494 |
| 2009/0182459 | A1 | * | 7/2009 | Liu | 700/299 |

* cited by examiner

*Primary Examiner* — Mark Paschall

(57) ABSTRACT

A method for quick temperature compensation for an electric soldering iron is provided. The electric soldering iron includes a static temperature control circuit and a dynamic temperature control circuit. Amount of the static temperature control mainly depends on a temperature setting signal, a real-time temperature detecting signal and a temperature additional signal, while the dynamic temperature control is made on the basis of Kalman digital filter principle. During the dynamic temperature control, a differentially amplified temperature regulation and control signal is identified by a heat transfer function of the soldering iron head, and an temperature additional compensation amount is calculated and output, only when the heat transfer function of the soldering iron head is conformed.

10 Claims, 4 Drawing Sheets

QUICK TEMPERATURE COMPENSATION METHOD FOR AN ELECTRIC SOLDERING IRON AND A QUICK TEMPERATURE COMPENSABLE ELECTRIC SOLDERING IRON

FIELD OF THE INVENTION

The present invention relates to temperature control technologies, more particularly, to a quick temperature compensation method for an electric soldering iron and a quick temperature compensable electric soldering iron.

BACKGROUND OF THE INVENTION

While lead-free solder satisfies the requirement of environment protection, a better thermal stability of the soldering iron is also required. The common soldering iron always uses a linear transformer as the power supply circuit. In this case, the output voltage is constant, and the output power is deficient at high temperature. As a single absolute temperature control manner is used as the temperature control manner, in the process of jointing, the rate of re-rising the temperature is slow, and a cold joint or rosin joint is inclined to take place. Some electric soldering irons use absolute temperature control manner to control the temperature-power of the electronic heating element, that is, only sample and control the absolute temperature of the heating element, but cannot determine the operation status of the heating element and the thermal requirement of the heated object and its effect to the temperature. When the temperature is falling, the transient response of the heating element is poor, thus the re-rising of the temperature is slow, and this cannot be used in the case that the heat transfer of the heating element changes rapidly. For example, temperature of the electric soldering iron is very high when it does not touch the metal to be welded, once it touches a big-size metal object or keeps contacting with the metal object for a long period of time, temperature of the electric soldering iron may fall rapidly due to the fast heat transfer. Moreover, the cold joint and rosin joint is especially easy to be induced in the case that the metal to be welded has a large surface or the environmental temperature is low. In order to detect the change status for the load to the soldering iron head, the nice difference of the temperature should be obtained in the shortest time. The earlier the detection occurs and the earlier the control performs, the quicker the induced response of the temperature is. However, the earlier the detection occurs, the weaker the detected signal is. And the detection should be ensured away from the affect of the interfering noise outside. Since the heating element and the temperature sensor element are all installed in the soldering iron head, the electronic signal from the temperature sensor element is delayed with respect to the actual time of the temperature change happened to the soldering iron head, and the time of the power change happened to the heating element is also delayed with respect to the actual time of the temperature change happened to the soldering iron head. It is crucial that how the factor of delay, the interference, and the requirement of response time should be considered in designing an electric soldering iron.

SUMMARY OF THE INVENTION

One aspect of the present invention is to provide a method for quick temperature compensation for an electric soldering iron, which take a heat conduction delay between a temperature detection point of the soldering iron head and a actual temperature for the solder joint of the soldering iron head and the heat transfer into account, and a temperature change for the solder joint of the soldering iron head is detected in good time in turn, the electronic power of the electronic soldering iron is compensated in a shortest time. Meanwhile, the signal change induced by the non-solder joint, such as circumstance noise, also should be taken into account, and the false action for power compensation will not be induced by such reasons.

One aspect of the present invention is to provide a quick temperature compensable electric soldering iron, which can rapidly detect any nice change of temperature of the electric soldering iron, and rapidly and accurately adjust the power of the electric soldering iron based on the detection signal, and insure that the electric soldering iron is away from the influence of the outside noise.

According to an aspect of the present invention, a method for quick temperature compensation for an electric soldering iron is provided, wherein a temperature sensor element and a heating core are installed in the electric soldering iron, the method comprising:

generating a temperature detection signal corresponding to a relative temperature value of the temperature sensor element inside the soldering iron head;

generating a temperature setting signal according to a setting temperature of the electronic soldering iron;

generating a temperature additional signal according to a temperature regulation and control signal;

implementing a difference operation to generate the temperature regulation and control signal, wherein input signals of the difference operation comprise the temperature detection signal, the temperature setting signal, and the temperature additional signal;

integrally and comparatively amplifying the temperature regulation and control signal;

damping the amplified temperature regulation and control signal, and photoelectrically coupling it to a controlled switching power source;

outputting a corresponding electronic power to the heating core within the soldering iron head by the controlled switching power source according to the coupled input regulation and control signal.

Advantageously, said step of generating a temperature additional signal according to a temperature regulation and control signal further comprises implementing a differential operation to the temperature regulation and control signal.

Advantageously, said step of generating a temperature additional signal according to a temperature regulation and control signal further comprises:

differentially amplifying the temperature regulation and control signal;

identifying feature of a heat transfer function of the soldering iron head for the temperature regulation and control signal according to the Kalman digital filtering principle; wherein when the heat transfer function of the soldering iron head is conformed, a solder joint occurs and an additional temperature compensation amount is calculated and output; when the heat transfer function of the soldering iron head is not conformed, the additional temperature compensation amount is set as zero, wherein, the heat transfer function of the soldering iron head is $\Delta A(t)=(A0-A1)(1-e^{-t/\tau})$, wherein, $\Delta A(t)$ is a temperature change detected by the sensor at time t, $A0$ is a temperature detected by the sensor in a static balance state, $A1$ is a lowest dropping temperature at the instant, when the jointing part of the soldering iron head contacts the solder joint, and $\tau$ is a time constant of the heat conduction of the soldering iron head.

Advantageously, the temperature setting signal in the input signals of the differential operation is generated in such a way that when the solder joint is not detected in a certain period, a suspending temperature signal applied to keep the electric soldering iron head at a suspended temperature is generated.

Advantageously, the input signals of the differential operation further comprises a power-off control signal generated in such a way that when the electric soldering iron head is detected at the suspended temperature beyond a specific period, the power-off control signal is generated.

According to another aspect of the present invention, a quick temperature compensable electric soldering iron is provided, comprising: a power source unit, a soldering iron head, an electric heating core for heating the soldering iron head, a temperature setting unit for setting a temperature of the soldering iron head, a temperature sensor within the soldering iron head for sensing the temperature of the soldering iron head, a controlled switching power source connected between the power source unit and the electric heating core, and a control unit for controlling the controlled switching power source based on the sensed temperature from the sensor and the setting temperature from the temperature setting unit, wherein the control unit further comprises: an additional temperature setting unit, an integral compared amplifier, a damp photoelectric coupling unit with its input terminal connected with an output terminal of the integral compared amplifier and an output terminal of the controlled switching power source respectively, and its output terminal connected with a control terminal of the controlled switching power source, an precise resistance amplifier with its input terminal connected with a thermal sensitive element, and a multiplexing difference unit with its input terminal connected with the temperature setting unit, the additional temperature setting unit and the precise resistance amplifier with a constant current source respectively, and its output terminal connected with an input terminal of the integral compared amplifier.

Advantageously, the additional temperature setting unit is connected between the output terminal of the multiplexing difference unit and the differential unit.

Advantageously, the additional temperature setting unit generates an additional temperature via a loop circuit for solder joint detection and temperature re-rising control according to the following process: identifying feature of a heat transfer function of the soldering iron head for the temperature regulation and control signal according to the Kalman digital filtering principle; wherein when the heat transfer function of the soldering iron head is conformed, a solder joint occurs and an additional temperature compensation amount is calculated and output; when the heat transfer function of the soldering iron head is not conformed, the additional temperature compensation amount is set as zero, wherein, the heat transfer function of the soldering iron head is $\Delta A(t)=(A0-A1)(1-e^{-t/\tau})$, wherein, $\Delta A(t)$ is a temperature change detected by the sensor at time t. $A0$ is a temperature detected by the sensor in a static balance state, $A1$ is a lowest dropping temperature at the instant when the jointing part of the soldering iron head contacts the solder joint, and $\tau$ is a time constant of the heat conduction of the soldering iron head.

Advantageously, the loop circuit for solder joint detection and temperature re-rising control comprises: a CPU unit, a suspending temperature setting unit, a differential amplifier unit, a pulse width modulation unit, and a sawtooth wave generating unit. Multiple input terminals of the multiplexing difference unit are connected with the temperature setting unit, the additional temperature setting unit, and the precise resistance amplifier respectively, meanwhile, the output terminal of the multiplexing difference unit is connected with the input terminal of the integral compared amplifier. The CPU unit provides control signal from its output terminal to the additional temperature setting unit, the suspending temperature setting unit and the sawtooth wave generating unit. An input terminal of the pulse width modulation unit is connected with the differential amplifier unit and the sawtooth wave generating unit, and an output terminal of the pulse width modulation unit is connected with the CPU unit. The input terminal of the differential amplifier unit is connected with the output terminal of the multiplexing difference unit.

Advantageously, the control unit further comprises an operation status indicating unit based on a driving signal provided from the output terminal of the CPU unit, and a power-off control unit connected between the CPU unit and the multiplexing difference unit, wherein said operation status indicating unit 16 comprises two LEDs with different color.

The method for quick temperature compensation for an electric soldering iron and the quick temperature compensable electric soldering iron in accordance with the present invention may be applied to quickly detect and respond a change of the thermal load of the soldering iron head without the affect of the interfering noise outside, and to ensure that the soldering iron head is operated at a setting temperature by quick and effective control on the heating element. When in suspension, the soldering iron head keeps at a setting suspending temperature. And the soldering iron head may get into sleep status based on a detection of being at the suspending status for a long period of time. Accordingly, the cold joint or rosin joint induced by a temperature change of the solder in the process of jointing are substantially avoided, and the rate and quality of the jointing are efficiently improved. Moreover, electronic power is saved and operation life of the soldering iron head is extended.

DETAILED DESCRIPTION OF THE PREFERRED EMBODIMENT

Figure 1:
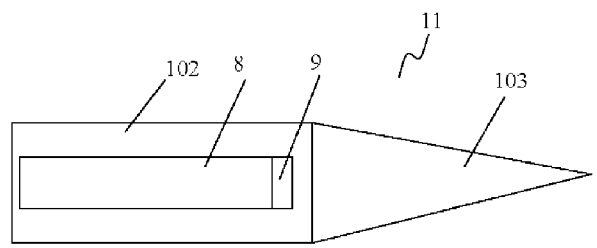
FIG. 1 is a structural diagram of an electronic soldering iron used in the method for a quick temperature compensation for an electric soldering iron according to the present invention.

Referring to FIG. 1, in the structural diagram of an soldering iron head in accordance with the electric soldering iron of the present invention, the soldering iron head 11 comprises: a ceramic heating core 8, a heated part 102 of the soldering iron head 11 surrounding the ceramic heating core 8, a soldering part 103 of the soldering iron head 11 incorporated with the heated part 102 but contacted with the soldered object, and a heat sensor 9 connected between a interior end of the soldering part 103 and the ceramic heating core 8. Apparently, referring to the diagram, in the operation of soldering by the soldering iron, surface temperature of the ceramic heating core 8 is the highest temperature, the temperature of the soldering part 103 of the soldering iron head 11 which contacts with the soldered object is the lowest temperature, and the temperature detected by the heat sensor 9 is a middle value. In general, when the ceramic heating core 8 heats, the heat energy may be conducted to the heated part 102 of the soldering iron head 11, and then to the soldering part 103 of the soldering iron head 11. In desired conditions, the temperature of the ceramic heating core 8 is stable, and the temperature change of the heated part 102 of the soldering iron head 11 is small as well as the soldering part 103 of the soldering iron head 11, and therefore the heat sensor 9 can't sense this small temperature change. In operation, once the soldering part 103 of the soldering iron head 11 contacts the soldered object, its temperature drops first. Due to the difference in temperature, the heated part 102 of the soldering iron head 11 transfers heat energy to the soldering part 103 of the soldering iron head 11. Similarly, heat energy also be transferred from the ceramic heating core 8 to the soldering part 103 of the soldering iron head 11, and in turn, the temperature of the ceramic heating core 8 also drops. The temperature adjustment may be only implemented when the temperature change detected by the heat sensor 9 arrives at a certain threshold in the conventional electronic soldering iron or electronic soldering station, but at this time, the temperature of the soldering iron head may drop several tens of degrees, and even the soldering process can not continue. In this way, large fluctuation occurs between the actual welding temperature and the setting temperature, and induces various disadvantages to the effect of the welding process. Only the moment when the soldering iron head contacts the soldered object, which is referred to as appearance of a solder joint, is determined rapidly and accurately, the heat energy consumed by the soldering iron head can be pre-compensated, thereby the temperature of the soldering part of the soldering iron head drops little during welding process and may return back to the setting temperature rapidly.

Figure 2:
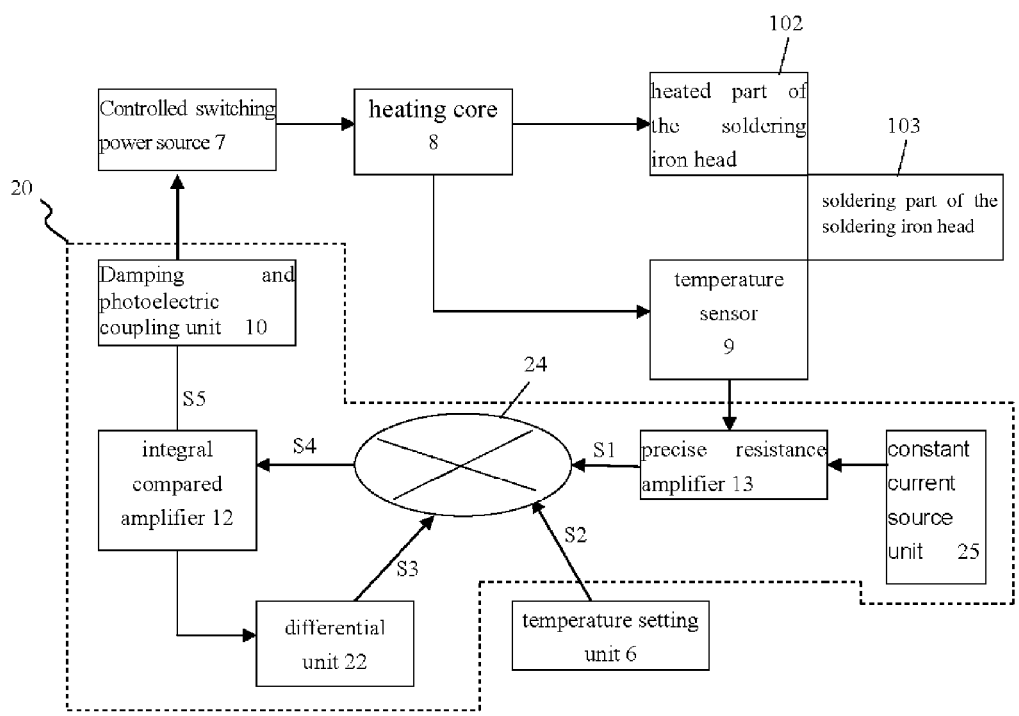
FIG. 2 is a logic block diagram of a quick temperature compensable electric soldering iron in accordance with a first embodiment of the present invention.

The quick temperature compensable electric soldering iron in accordance with a first embodiment of the present invention showed in FIG. 2 comprises a power source unit (not shown), a soldering iron head 11 including a heated part 102 and a soldering part 103, a electronic heating core 8 installed inside the soldering iron head for heating the soldering iron head, and a temperature sensor 9 installed inside the soldering iron head for sensing the temperature of the soldering iron head. In order to implement a temperature control for the soldering iron head, it also comprises a temperature setting unit 6 for setting a desired temperature of the soldering iron head, a controlled switching power source 7 connected between the power source unit and the electric heating core 8, and a control unit 20 for controlling the controlled switching power source 7 based on the sensed temperature from the sensor 9 and the setting temperature from the temperature setting unit 6. As a control loop circuit for quick temperature detection and compensation, the control unit 20 in this embodiment of the present invention comprises a differential unit (corresponding to the additional temperature setting unit) 22, an integral compared amplifier unit 12, a damping and photoelectric coupling unit 10 with its input terminal connected with an output terminal of the integral compared amplifier unit 12 and an output terminal of the controlled switching power source 7 respectively, and its output terminal connected with a control terminal of the controlled switching power source 7, a precise resistance amplifier 13 with its input terminal connected with the thermal sensitive element 9, and a multiplexing difference unit 24 with its input terminals connected with the temperature setting unit 6, the differential unit 22 used as the additional temperature setting unit and the precise resistance amplifier 13 with a constant current source 25 respectively, and an output terminal of the multiplexing difference unit 24 is connected with the input terminal of the integral compared amplifier unit 12, wherein, the multiplexing difference unit 24 is used to generate a temperature adjusting value S4, which depends on three values, that is, a temperature change S1 independent of the absolute temperature provided from the precise resistance amplifier 13 with a constant current source 25, a setting temperature signal S2 from the temperature setting unit 6, and a feedback signal S3 representing a change of the adjusting value provided from the additional temperature setting unit 22, which includes a differential unit. The output S4 from the multiplexing difference unit 24 is communicated to the integral compared amplifier unit 12, and then, the integral compared amplified signal S5 is used to control the controlled switching power source 7 via the damping and photoelectric coupling unit 10, and in turn, to control the electronic power of the electric heating core 8.

Since there are several signals detected by the precise resistance amplifier 13, and how to choose a signal representing the change of the solder joint from these signals is crucial for identifying the solder joint timely and rapidly. The appearance of the solder joint is considered as a disturbance to the static system, and destroys a balance of the system. Apparently, if the disturbance can be detected and another disturbance with a same size is forced at the opposite direction immediately, the detected disturbance signal may be a base provided by the additional temperature setting unit 22 to the multiplexing difference unit 24 for calculating an adjusting signal, thus the system will resume the balance status.

Without doubt that, the earlier the detection time is, the smaller the destruction to the system balance is, and the shorter the compensation time for the additional temperature applied on the opposite direction is, as well as the time taken by the system to resume its balance.

Figure 3:
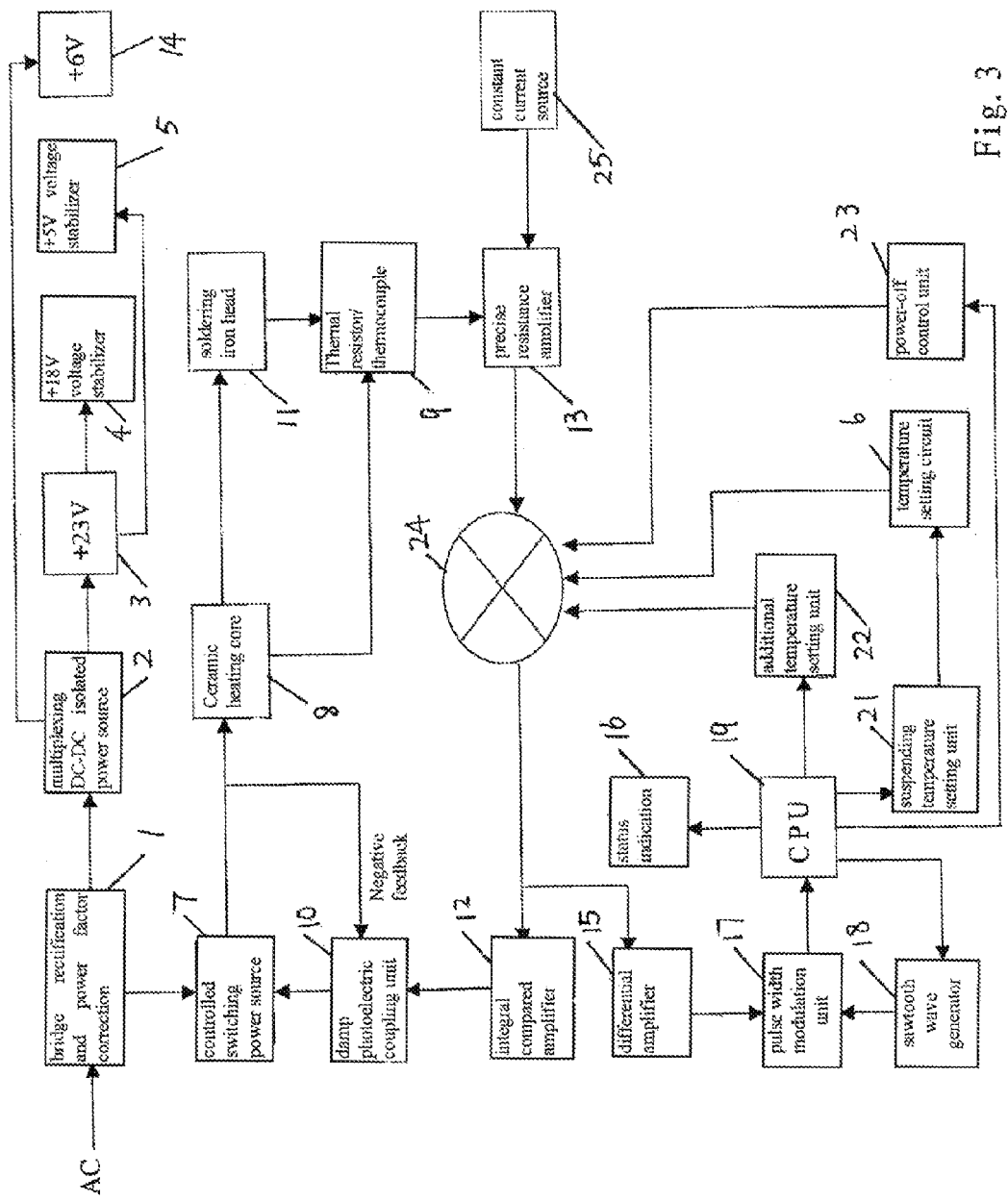
FIG. 3 is a logic block diagram of a quick temperature compensable electric soldering iron in accordance with a second embodiment of the present invention.

The quick temperature compensable electric soldering iron in accordance with a second embodiment of the present invention showed in FIG. 3 comprises a control loop circuit used to apply Kalman digital filtering to the temperature signal of the solder joint, besides the control loop circuit in the first embodiment. More specifically, the manner for generating an additional temperature signal changes. In the present embodiment, the additional temperature setting unit 22 generates an additional temperature signal by employing a control loop circuit for solder joint detection and temperature re-rising control. The said control loop circuit comprises a differential amplifier unit 15, a pulse width modulation unit 17, and a sawtooth wave generating unit 18, a CPU 19, and an additional temperature setting unit 22, and so on. The operating principle of the control loop circuit is as follows: identifying feature of a heat transfer function of the soldering iron head for the temperature regulation and control signal according to the Kalman digital filtering principle; wherein when the heat transfer function of the soldering iron head is conformed, a solder joint occurs and an additional temperature compensation amount is calculated and output; when the heat transfer function of the soldering iron head is not conformed, the additional temperature compensation amount is set as zero, wherein, the heat transfer function of the soldering iron head is $\Delta A(t)=(A0-A1)(1-e^{-t/\tau})$, wherein, $\Delta A(t)$ is a temperature change detected by the sensor at time t, A0 is a temperature detected by the sensor in a static balance state, A1 is a lowest dropping temperature at the instant when the jointing part of the soldering iron head contacts the solder joint, and $\tau$ is a time constant of the heat conduction of the soldering iron head. Once the soldering iron head is determined, the time constant τ may be pre-determined by experiments. Since a heat transfer rule of the soldering iron head is pre-obtained, the temperature change of the solder joint may be detected via the manner of Kalman digital filtering process. More specifically, once the time constant τ is determined, a solder joint may be determined by searching a lookup table in such a way that the temperature detected by the sensor in the static balance state A0, the lowest dropping temperature at the instant when the soldering part of the soldering iron head contacts the solder joint A1, and the time constant τ are used as independent variables to search a predefined table, and then the resulting value is utilized to determine whether it is a solder joint. For example, if it is not a solder joint, output of the lookup table may be zero or other neglectable values; and if it is a solder joint currently after filtering, a corresponding adjusting value is output and communicated to the multiplexing difference unit 24 as an additional temperature setting signal. A complete process of solder joint identification and compensation is described below combined with the method of the present invention. When a disturbance induced by a solder joint occurs at a time, the temperature change detected by the heat sensor 9 is certain to accord with the above-mentioned formula of thermal inertia. Wherein, the multiplexing difference unit 24 in the loop circuit for solder joint detection and temperature addition uses the integral compared amplifier as a reference voltage, that is, the reference voltage of the multiplexing difference unit 24 is proportion to temperature of a previous period of time. Thereby, the temperature of the system is eliminated as well as the temperature interference of the system after differential amplification, and only the temperature changes are amplified. The pulse width modulation unit 17 and the sawtooth wave generating unit 18 (corresponding to an A/D converter) communicates the amplified temperature changes to the CPU 19. Apparently the values communicated to the CPU 19 also comprise various interferences. The interferences are eliminated and characteristic values representing the temperature changes, such as frequency, amplitude, phase angle and so on, are picked up by the CPU 19 via utilizing the Kalman digital filtering principle. If the characteristic values accords with the formula of thermal inertia, either the identification or the compensation value may be performed via the manner of a lookup table.

Compared with the first embodiment, a power-off control unit 23 and a suspending temperature setting unit 21 are added in the multiplexing difference unit 24 in the present embodiment, wherein a suspending temperature is used to set a temperature of the soldering iron in a standard operation, which is generally lower than the setting temperature; the power-off control is used to calculate a consecutive period of time of being at the suspending temperature. If the consecutive period of time excesses a prescribed time period, the power-off control unit 23 will power-off the electronic soldering iron. A power source is also shown in FIG. 3, comprising an unit for EMI filtering, bridge rectification and power factor correction 1, a multiplexing DC-DC isolated power source 2, +23V voltage unit 3, +18V stabilized voltage unit 4, +5V voltage unit 5, +6V voltage unit 14.

Figure 4:
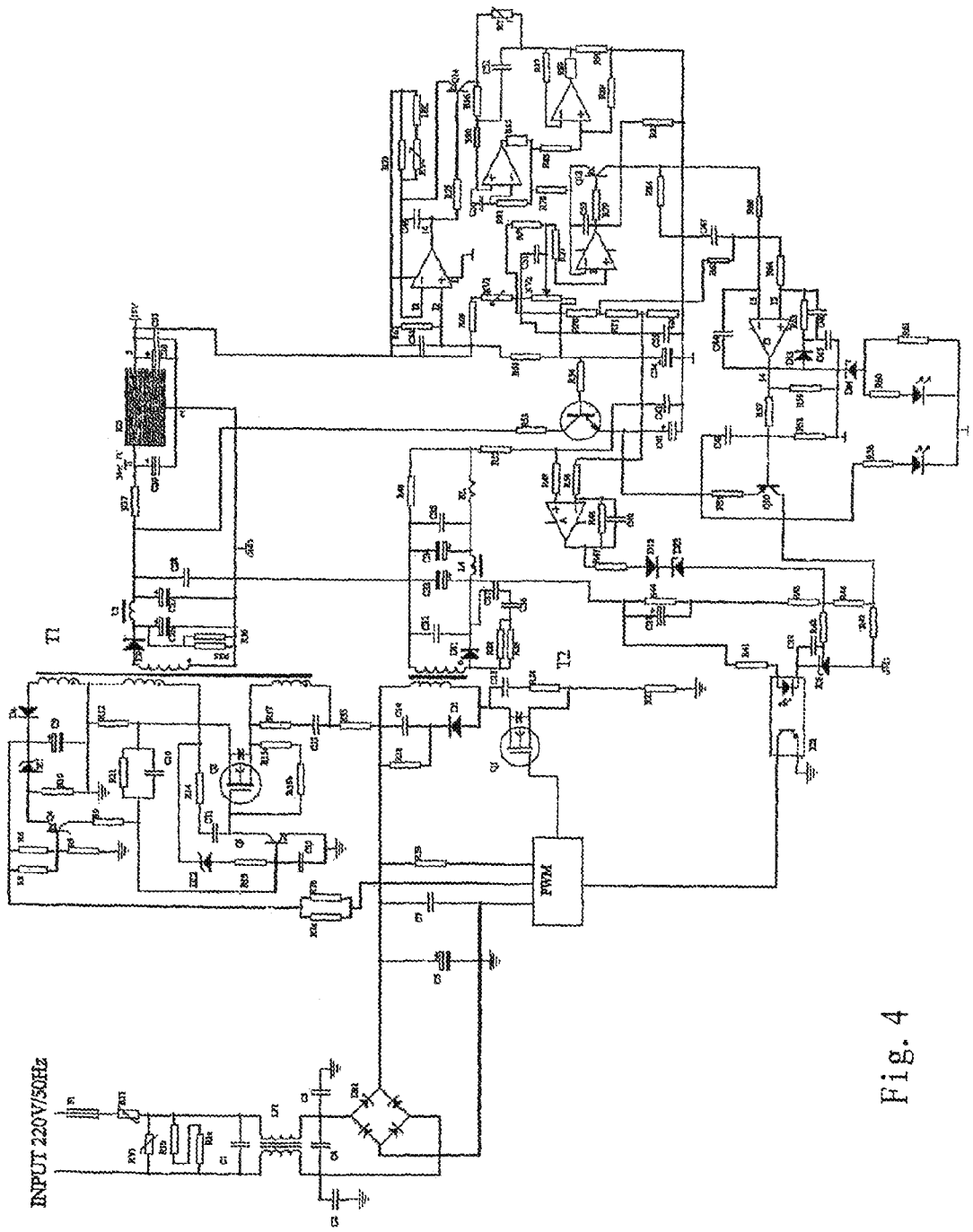
FIG. 4 is a circuit schematic diagram of a quick temperature compensable electric soldering iron in accordance with the first embodiment of the present invention.
Figure 5:
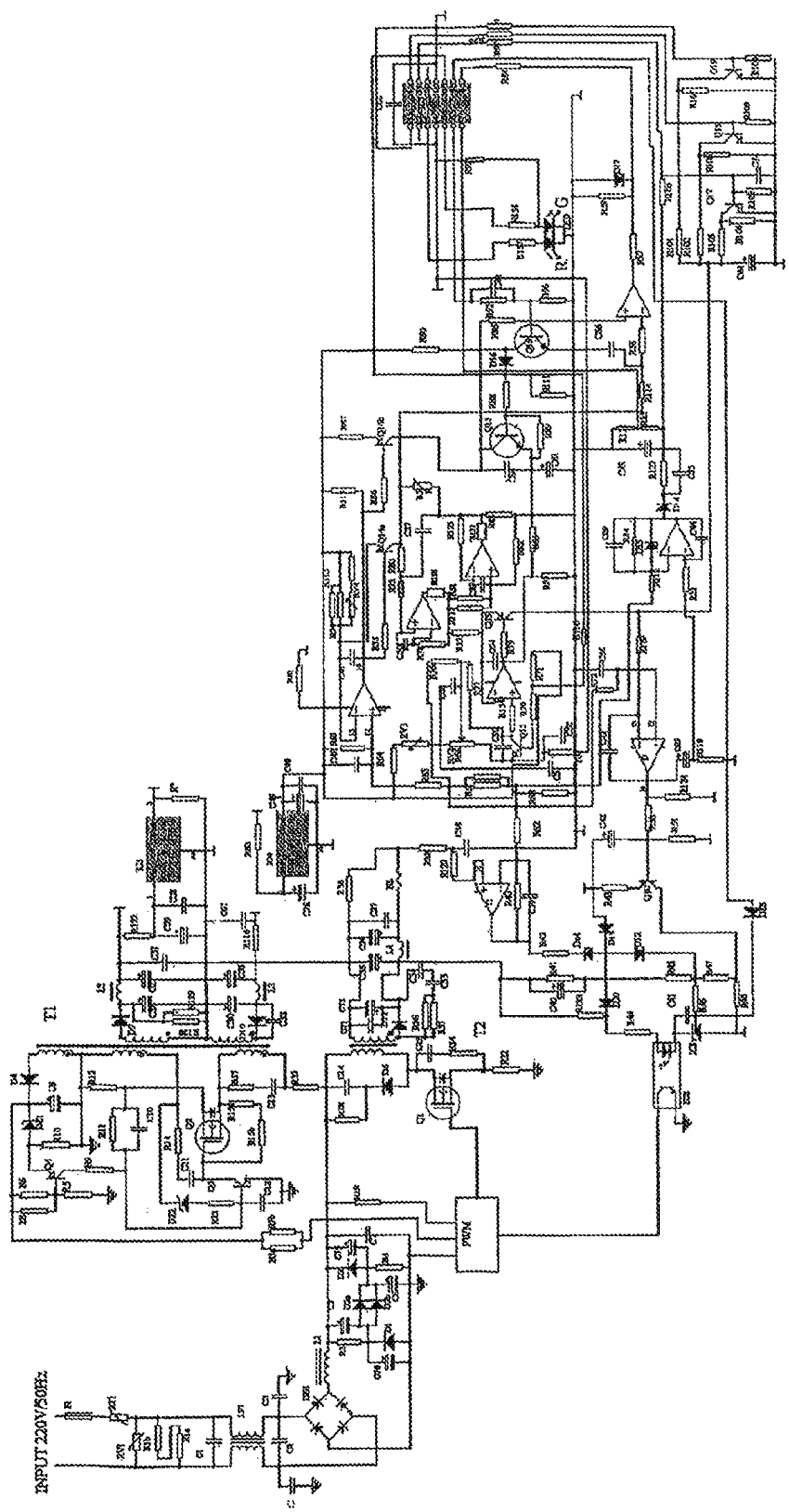
FIG. 5 is a circuit schematic diagram of a quick temperature compensable electric soldering iron in accordance with the second embodiment of the present invention.

FIG. 4 and FIG. 5 are circuit schematic diagrams of the quick temperature compensable electric soldering iron in accordance with the first and second embodiment of the present invention respectively.

The quick temperature compensable electric soldering iron provided in the present invention includes a static temperature control loop circuit and a dynamic temperature control loop circuit, wherein the amount of the static temperature adjustment mainly depends on the temperature setting signal, the real-time temperature detecting signal and the temperature additional signal, while the dynamic temperature control is based on the Kalman digital filtering principle. During the dynamic temperature control, characteristic identification of the heat transfer function of the soldering iron head is implemented on the differential amplified temperature adjusting signal, and the temperature additional compensation amount is calculated and exported only when the heat transfer function of the soldering iron head is conformed. Various embodiments described in the present invent are presented by way of example only, and not limitation; Person skilled in the relevant art may implement the present invention in different forms without departing from the protection scope of the present invention recorded in the claims.

I claim:

1. A method for quick temperature compensation for an electric soldering iron, wherein a temperature sensor element and a heating core are installed in a soldering iron head of the electric soldering iron, the method comprising:
    generating a temperature detection signal corresponding to a relative temperature value of the temperature sensor element inside the soldering iron head;
    generating a temperature setting signal according to a setting temperature of the electronic soldering iron;
    generating a temperature additional signal according to a first temperature regulation and control signal at time t;
    implementing a difference operation to generate a second temperature regulation and control signal at time t+Δt, wherein input signals of the difference operation comprise the temperature detection signal, the temperature setting signal, and the temperature additional signal generated at time t;
    integrally and comparatively amplifying the second temperature regulation and control signal to generate an amplified second temperature regulation and control signal;
    damping and photoelectrically coupling the amplified second temperature regulation and control signal to a controlled switching power source;
    outputting a corresponding electronic power to the heating core within the soldering iron head by the controlled switching power source according to the amplified second temperature regulation and control signal that is photoelectrically coupled to the controlled switching power source.

2. The method as in claim 1, wherein said step of generating a temperature additional signal according to a first temperature regulation and control signal further comprises implementing a differential operation to the first temperature regulation and control signal.

3. The method as in claim 1, wherein said step of generating a temperature additional signal according to a first temperature regulation and control signal further comprises:
    differentially amplifying the first temperature regulation and control signal to generate a differentially amplified first temperature regulation and control signal;
    identifying feature of a heat transfer function of the soldering iron head for the differentially amplified first temperature regulation and control signal according to Kalman digital filtering principle; wherein when the heat transfer function of the soldering iron head is conformed, a solder joint occurs and an additional temperature compensation amount is calculated and output; when the heat transfer function of the soldering iron head is not conformed, the additional temperature compensation amount is set as zero, wherein, the heat transfer function of the soldering iron head is $\Delta A(t)=(A0-A1)(1-e^{-t/\tau})$, wherein, $\Delta A(t)$ is a temperature change detected by the temperature sensor element at time t, A0 is a temperature detected by the temperature sensor element in a static balance state, A1 is a lowest dropping temperature at an instant when a soldering part of the soldering iron head contacts the solder joint, and $\tau$ is a time constant of heat conduction of the soldering iron head.

4. The method as in claim 3, wherein the temperature setting signal in the input signals of the differential operation is generated in such a way that when the solder joint is not detected in a certain period, a suspending temperature signal applied to keep the soldering iron head at a suspended temperature is generated.

5. The method as in claim 4, wherein the input signals of the differential operation further comprises a power-off control signal generated in such a way that when the soldering iron head is detected at the suspended temperature beyond a specific period, the power-off control signal is generated.

6. A quick temperature compensable electric soldering iron, comprising: a power source unit, a soldering iron head, an electric heating core (8) for heating the soldering iron head (11), a temperature setting unit (6) for setting a temperature of the soldering iron head (11), a temperature sensor (9) within the soldering iron head for sensing the temperature of the soldering iron head, a controlled switching power source (7) connected between the power source unit and the electric heating core (8), and a control unit (20) for controlling the controlled switching power source (7) based on the sensed temperature from the temperature sensor (9) and the setting temperature from the temperature setting unit (6), wherein the control unit (20) further comprises:
   an additional temperature setting unit (22);
   an integral compared amplifier (12);
   a damping and photoelectric coupling unit (10), having an input terminal connected with an output terminal of the integral compared amplifier (12) and an output terminal of the controlled switching power source (7) respectively, and an output terminal connected with a control terminal of the controlled switching power source (7);
   a precise resistance amplifier (13) with an input terminal connected with the temperature sensor (9); and
   a multiplexing difference unit (24), having multiple input terminals connected with the temperature setting unit (6), the additional temperature setting unit (22) and the precise resistance amplifier (13) with a constant current source (25) respectively, and an output terminal connected with an input terminal of the integral compared amplifier (12).

7. The quick temperature compensable electric soldering iron as in claim 6, wherein the additional temperature setting unit (22) is a differential unit connected to the input terminal of the multiplexing difference unit (24).

8. The quick temperature compensable electric soldering iron as in claim 6, wherein the additional temperature setting unit (22) generates an additional temperature signal via a loop circuit for solder joint detection and temperature re-rising control according to the following process: identifying feature of a heat transfer function of the soldering iron head for a differentially amplified temperature regulation and control signal according to Kalman digital filtering principle; wherein when the heat transfer function of the soldering iron head is conformed, a solder joint occurs and an additional temperature compensation amount is calculated and output; when the heat transfer function of the soldering iron head is not conformed, the additional temperature compensation amount is set as zero, wherein, the heat transfer function of the soldering iron head is $\Delta A(t)=(A0-A1)(1-e^{-t/\tau})$, wherein, $\Delta A(t)$ is a temperature change detected by the temperature sensor at time t, A0 is a temperature detected by the temperature sensor in a static balance state, A1 is a lowest dropping temperature at an instant when a soldering part of the soldering iron head contacts the solder joint, and $\tau$ is a time constant of heat conduction of the soldering iron head.

9. The quick temperature compensable electric soldering iron as in claim 8, wherein the loop circuit for solder joint detection and temperature re-rising control comprises a CPU unit (19), a suspending temperature setting unit (21), a differential amplifier unit (15), a pulse width modulation unit (17), and a sawtooth wave generating unit (18);
   the multiple input terminals of the multiplexing difference unit (24) are connected with the temperature setting unit (6), the additional temperature setting unit (22), and the precise resistance amplifier (13) respectively, and the output terminal of the multiplexing difference unit (24) is connected with the input terminal of the integral compared amplifier (12);
   an output terminal of the CPU unit (19) is connected and provides control signal to the additional temperature setting unit (22), the suspending temperature setting unit (21) and the sawtooth wave generating unit (18);
   an input terminal of the pulse width modulation unit (17) is connected with the differential amplifier unit (15) and the sawtooth wave generating unit (18), and an output terminal of the pulse width modulation unit (17) is connected with the CPU unit (19);
   an input terminal of the differential amplifier unit (15) is connected with the output terminal of the multiplexing difference unit (24).

10. The quick temperature compensable electric soldering iron as in claim 9, wherein the control unit further comprises an operation status indicating unit (16) based on a driving signal provided from the output terminal of the CPU unit (19), and a power-off control unit (23) connected between the CPU unit (19) and the multiplexing difference unit (24), wherein said operation status indicating unit (16) comprises two LEDs with different color.

* * * * *